US006188574B1

United States Patent
Anazawa

(10) Patent No.: US 6,188,574 B1
(45) Date of Patent: Feb. 13, 2001

(54) COOLING STRUCTURE FOR ELECTRIC VEHICLE

(75) Inventor: Makoto Anazawa, Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/356,726

(22) Filed: Jul. 20, 1999

(30) Foreign Application Priority Data

Jul. 21, 1998 (JP) .................................................. 10-205672

(51) Int. Cl.⁷ ............................... H05H 7/20; B60K 1/04
(52) U.S. Cl. .................... 361/695; 180/68.5; 361/641; 361/676; 429/100
(58) Field of Search .................................. 180/65.2, 65.3, 180/65.8; 361/600, 641, 643, 676, 679, 694–695; 429/96–100

(56) References Cited

U.S. PATENT DOCUMENTS

| 5,390,754 | * | 2/1995 | Masuyama et al. | 180/68.5 |
| 5,392,873 | * | 2/1995 | Masuyama et al. | 180/68.5 |
| 5,534,364 | * | 7/1996 | Watanaabe et al. | 429/99 |
| 6,085,854 | * | 7/2000 | Nishkawa | 180/68.5 |

FOREIGN PATENT DOCUMENTS

| 6-344950 | 12/1994 | (JP) . |
| 7-212903 | 8/1995 | (JP) . |
| 10-121960 | 5/1998 | (JP) . |

\* cited by examiner

Primary Examiner—Gregory Thompson
(74) Attorney, Agent, or Firm—Carrier, Blackman & Associates, P.C.; Joseph P. Carrier; William D. Blackman

(57) ABSTRACT

A cooling structure for an electric vehicle includes a battery box provided with at least one battery, a blower fan supplying air to cool the batteries, a wind box disposed on the battery box and provided with at least one electric component to be cooled. The wind box is formed with an air passage having a substantially U-shape when viewed from the top, on which the electric component is disposed. The wind box includes an air inlet connected to the blower fan and an air outlet communicating with one end of the battery box, so that the air from the blower fan is supplied to the battery box via the wind box.

13 Claims, 13 Drawing Sheets

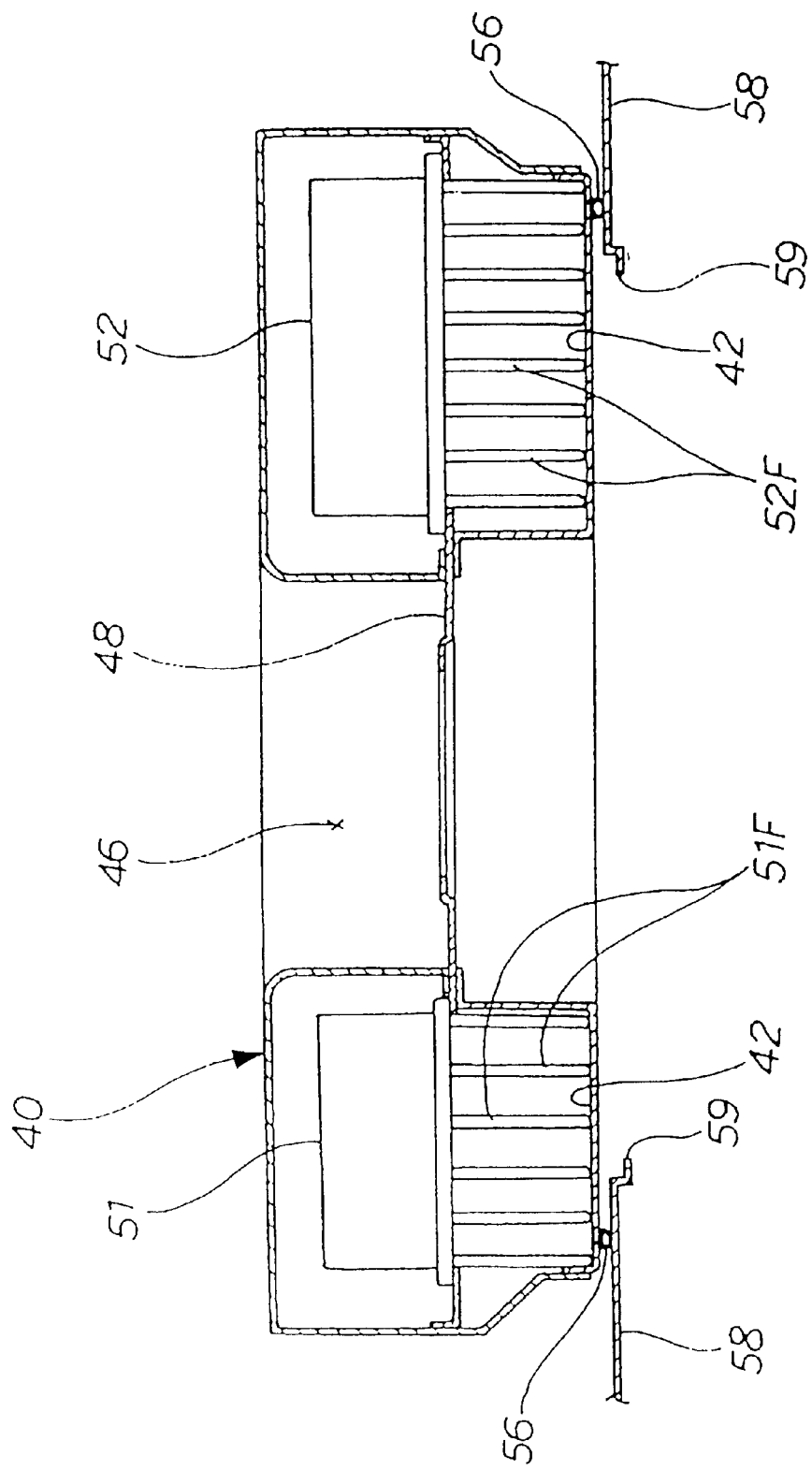

COOLING STRUCTURE FOR ELECTRIC VEHICLE

BACKGROUND OF THE INVENTION

1. Field of the Invention

The present invention relates to an improved cooling structure for an electric vehicle for forcibly cooling batteries and electrical components of the electric vehicle.

2. Description of the Related Art

In general, an electric vehicle runs with electric energy stored in batteries. These batteries generate heat when they are charged and electricity is discharged therefrom (hereinafter, referred to as "when the vehicle runs"). To cope with this, batteries have to forcibly be cooled when they are charged and the vehicle runs, and as a technology of this type, the "Battery Ventilating Device for Electric Vehicle" is proposed in Japanese Patent Unexamined Publication No. HEI 10-121960. In this proposed device, an intake port and exhaust ports are provided in a battery box, and blower fans are mounted in the exhaust ports, whereby when operated, the blower fans take in outside air from the intake port and battery cells are forcibly cooled with air so taken in.

In general electric vehicles, an auxiliary battery is provided (for supplying electricity to various lamps fitted thereon), and therefore a system is adopted in such electric vehicles in which electricity is supplied from power batteries (battery cells 1) to that auxiliary battery via a downverter.

In addition, a battery charger should normally be equipped on the vehicle for supplying electricity from a commercial power source to the power batteries.

In other words, general electric vehicles are equipped with a downverter and a battery charger as well as power batteries, and the downverter and battery charger themselves also generate heat when in use.

FIGS. 13A, 13B show typical examples of conventional cooling structures for an electric vehicle.

In the example shown in FIG. 13A, an intake duct 102 is provided rightward of a battery box 101 and exhaust ducts 103, 103 are provided leftward of the same box 101. Blowers 104, 104 are disposed at respective predetermined positions along the exhaust ducts 103, 103. A downverter 105 and a battery charger 106 are disposed in the intake duct 102. The downverter 105 and the battery charger 106 are forcibly cooled with air taken from the outside, and thereafter batteries 107 . . . (hereinafter, the dots, . . . , means plurality) are cooled.

In the example shown in FIG. 13B, the intake duct 102 is provided rightward of the battery box 101 and the exhaust ducts 103, 103 are provided leftward of the same box 101. A forced draft fan 108, the downverter 105 and the battery charger 106 are disposed in the intake port 102. The downverter 105 and the battery charger 106 are first cooled with air forced in by the forced draft fan 108 and thereafter the batteries 107 . . . are cooled.

The example shown in FIG. 13A is characterized in that the necessity of blowers 104, 104 for exclusive use for the downverter 105 and the battery charger 106 can be excluded by forcibly cooling the downverter 105 and the battery charger 106 by the blowers 104, 104 for cooling the batteries 107 . . . However, this increases the overall length La of the battery box 101, and therefore the example is not suitable for a small electric vehicle.

Similarly, with the example shown in FIG. 13B, the overall length of the battery box 101 is increased, and therefore the example is also not suitable for a small electric vehicle.

SUMMARY OF THE INVENTION

Accordingly, it is a first object of the present invention to provide a cooling structure for an electric vehicle that is short in length.

A cooling structure for an electric vehicle includes a battery box provided with at least one battery, a blower fan supplying air to cool the batteries, a wind box disposed on the battery box and provided with at least one electric component to be cooled. The wind box is formed with an air passage having a substantially U-shape when viewed from the top, on which the electric component is disposed. The wind box includes an air inlet connected to the blower fan and an air outlet communicating with one end of the battery box, so that the air from the blower fan is supplied to the battery box via the wind box.

The overall length of the cooling structure of an electric vehicle can be reduced by overlaying the wind box on the battery box. At least one electric component is disposed in the wind box for forcible cooling.

The overall length of the wind box is reduced by forming the substantially U-shaped air passage as viewed from the top within the wind box, and an air inlet and an air outlet are provided at substantially the same positions within the wind box, so that the cooling of the battery box is started in the vicinity of the blower fan. Accordingly, although the overall length is short, the electric component and the batteries can effectively be cooled.

BRIEF DESCRIPTION OF THE DRAWINGS

FIG. 5 is a sectional view taken along the line V—V of FIG. 3;

DETAILED DESCRIPTION OF THE PREFERRED EMBODIMENTS

A mode for implementation of the present invention will be described below while referring to the accompanying drawings.

Figure 1:
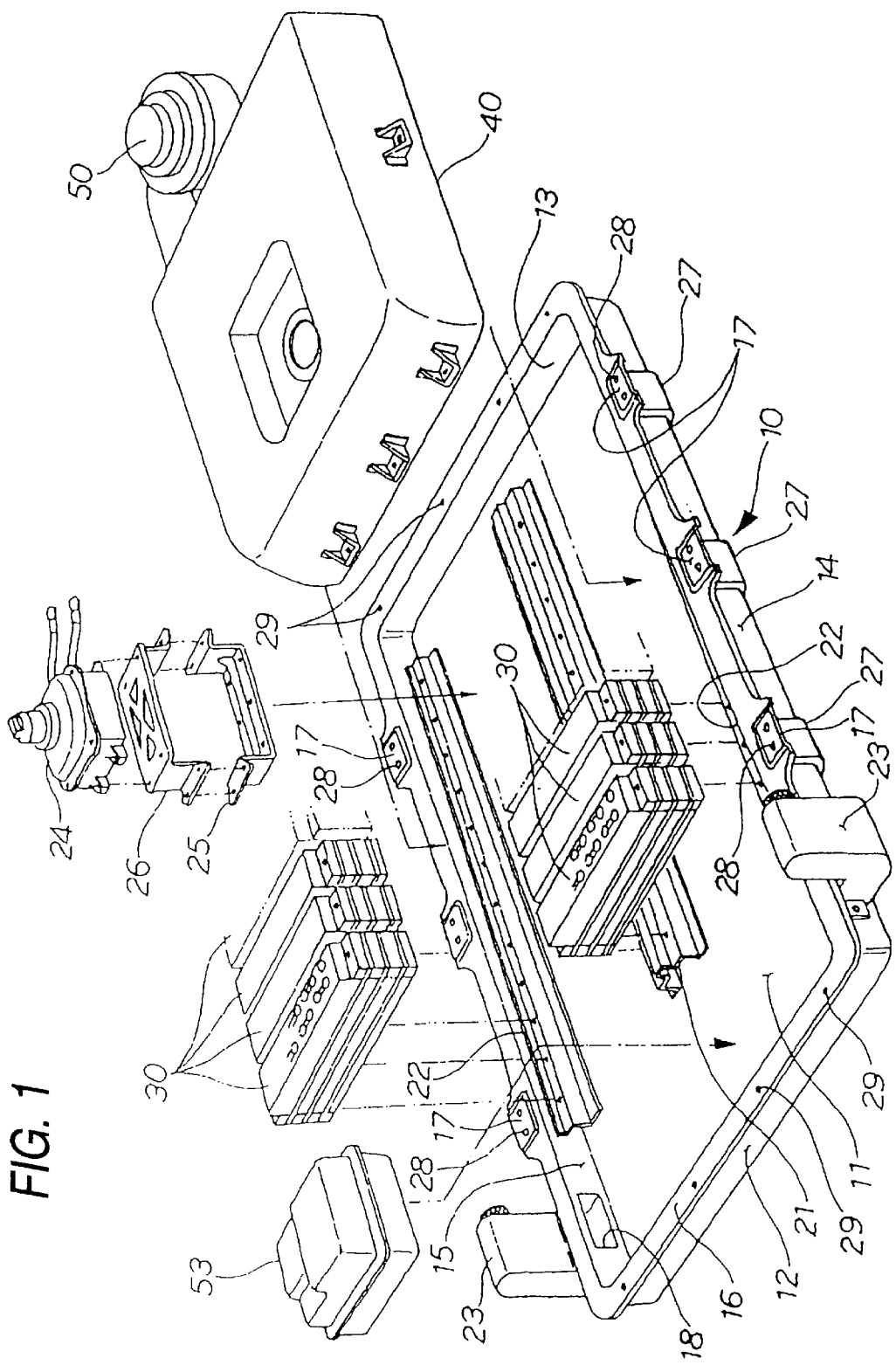
FIG. 1 is an exploded perspective view showing a cooling structure for an electric vehicle according to the present invention.

FIG. 1 is an exploded perspective view of a cooling structure for an electric vehicle according to the present invention, and the cooling structure for an electric vehicle basically includes a battery box 10, a wind box 40 and a blower fan 50.

The battery box 10 includes a bottom plate 11, short peripheral walls (front wall 12, rear wall 13, left wall 14, right wall 15), a seal flange 16 formed on the peripheral walls, mounting flanges 17 . . . for fixation to the vehicle body, exhaust ports 18, 18 opened at front portions of, respectively, the left and right walls 14, 15 (with the port 18 on this side, that is, on the left wall 14 being not shown), and a center rail 21 and left and right rails 22, 22 for mounting batteries 30.

Reference numeral 23 denotes an air exhaust duct, 24; a breaker box, 25 and 26; a breaker box supporting bracket, 27 . . . ; a reinforcement frame, 28 . . . ; a fixing bolt hole, 29 . . . ; a seal clamping bolt hole, and 53; a third electric component.

Figure 2:
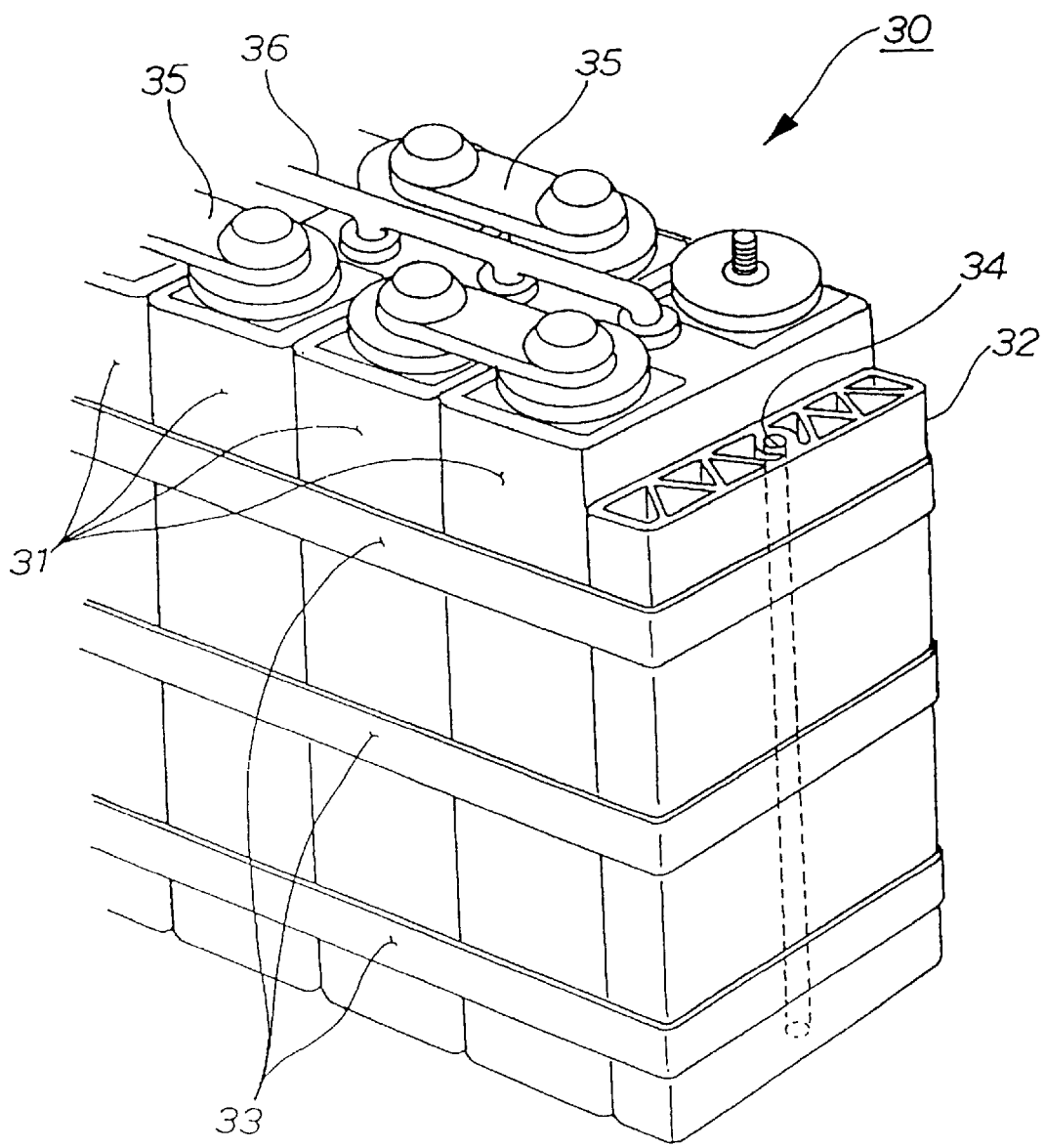
FIG. 2 is a perspective view of a battery for use in the present invention.

FIG. 2 is a perspective view of a battery 30 for use in the present invention, and the battery 30 includes a plurality of battery cells 31 . . . set in array, fixing plates 32, 32 provided at ends of the array (with a left end plate 32 not being shown) and belts 33, 33, 33 for clamping the cells 31 . . . and the two fixing plates 32, 32 together, whereby the battery is formed as a box. The fixing plate 32 is constituted by, for instance, a honeycomb structure plate that is extrusion molded by extruding a light metal, and therefore although it is light in weight, the fixing plate 32 is rigid. Reference numeral 34 denotes a bolt hole, 35 . . . ; a connecting wire, and 36; an air vent tube.

Figure 3:
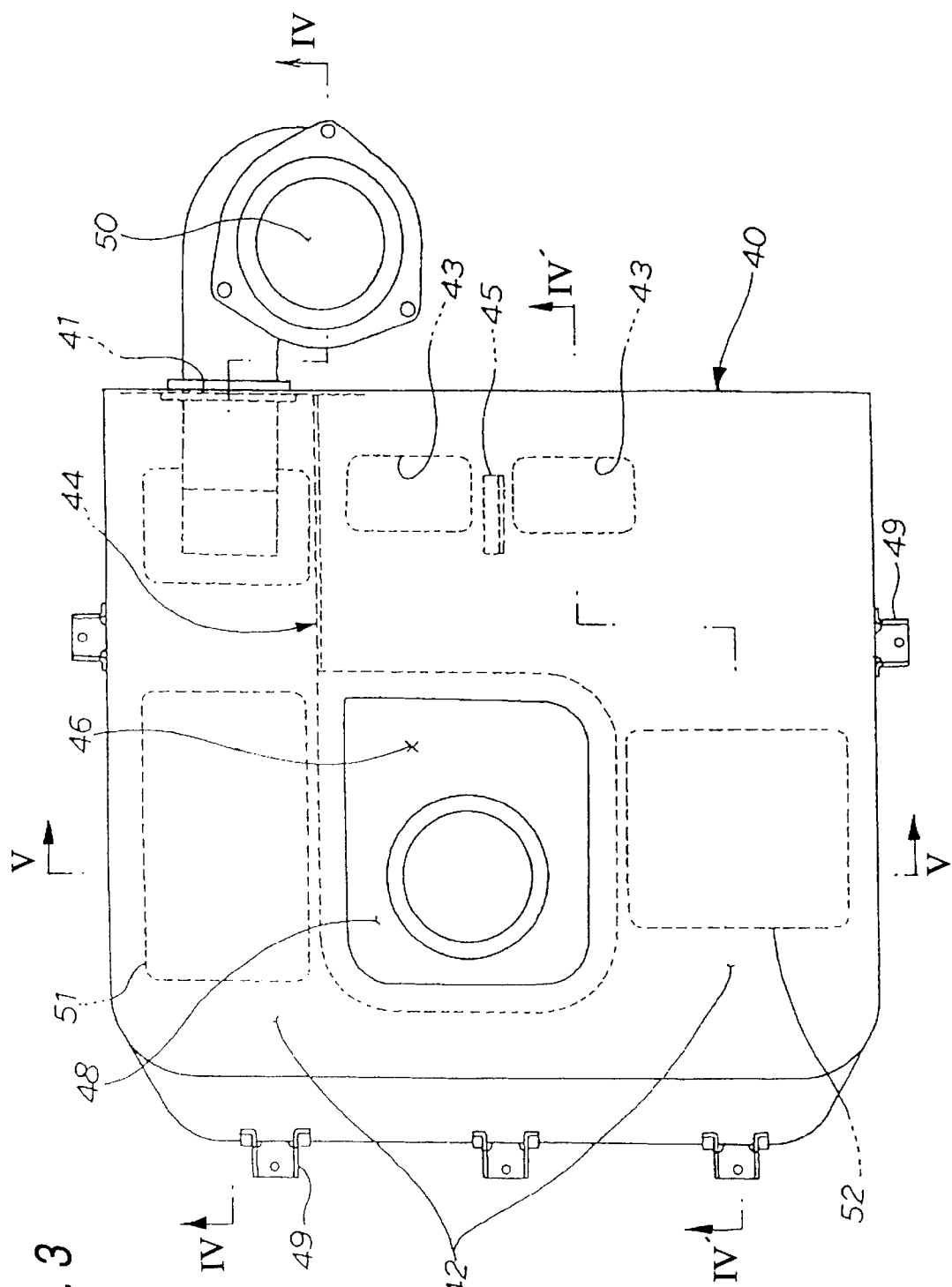
FIG. 3 is a plan view of a wind box according to the present invention.

FIG. 3 is a plan view of the wind box according to the present invention, and there is provided in one of corners thereof an air inlet 41 toward which the blower fan 50 is faced. In addition, there are provided an air passage 42 that forms a U- or square shape when viewed from the top (hereinafter, referred to as a substantially U-shape) and that air is directed counterclockwise therein, and air outlets 43, 43 formed at a termination end of the air passage 42. Reference numeral 44 denotes a partition plate, 45; an intervened partition plate extending downward between the two air outlets 43, 43, 46; a space at the center of the air passage 42, and 48; an intermediate partition plate extended across the space 46.

Moreover, reference numeral 51 denotes a first electric component (for instance, a downverter), 52; a second electric component (for instance, a battery charger), and 49 . . . ; a metallic fixture.

Figure 4A:
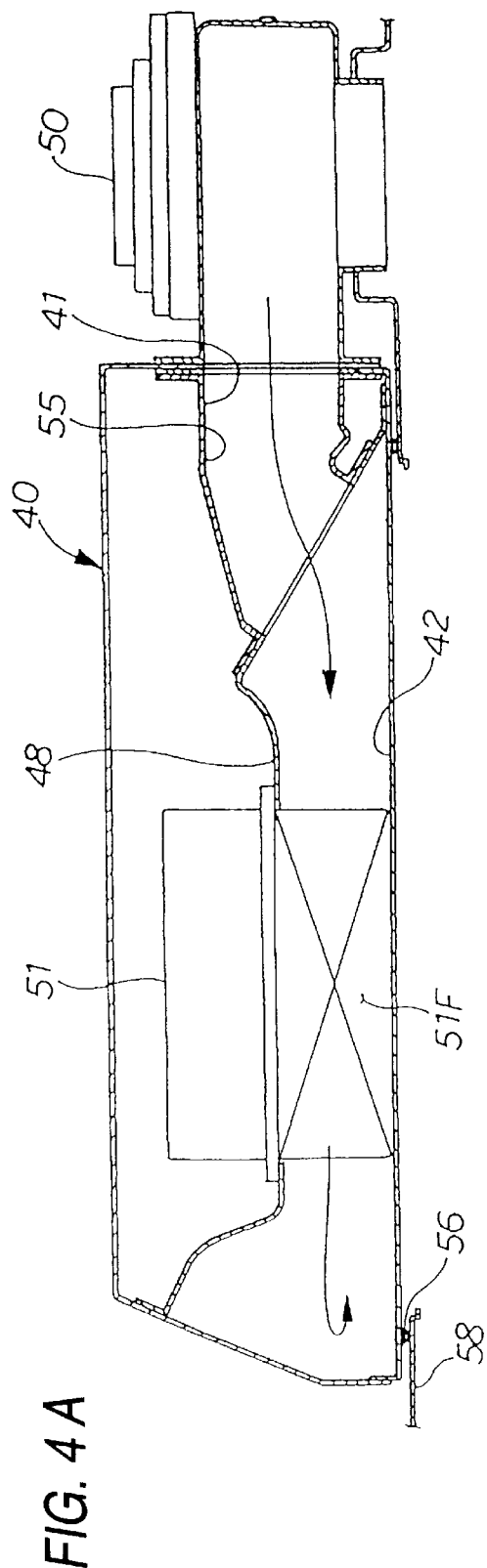
FIGS. 4A and 4B are sectional views taken along lines IV—IV and IV'—IV' of FIG. 3.
Figure 4B:
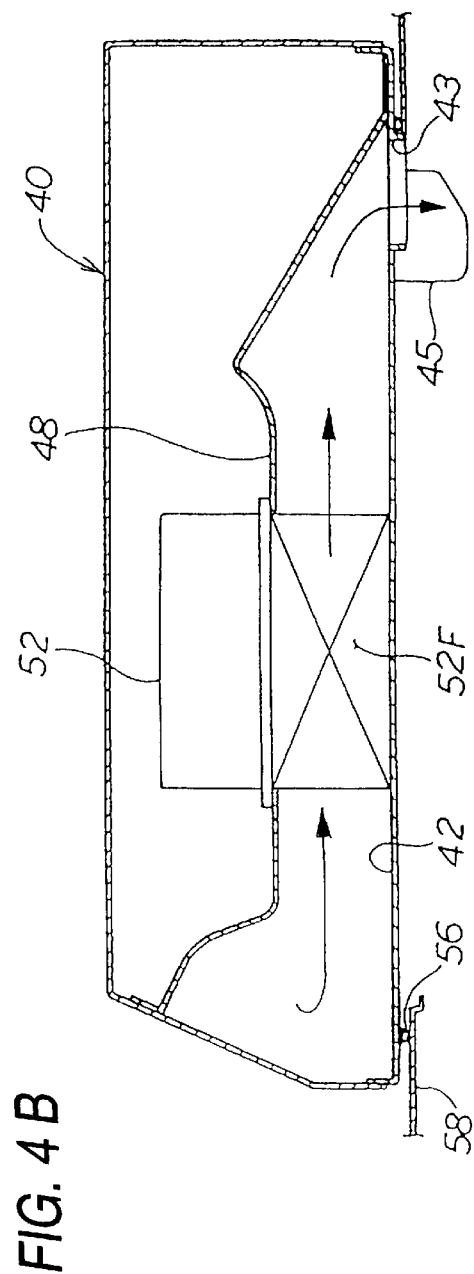

FIGS. 4A, 4B are sectional views taken, respectively, along lines IV—IV and IV'—IV' of FIG. 3.

As shown in FIG. 4A (the sectional view taken along the line IV—IV of FIG. 3), the wind box 40 is a type which is partitioned by the intermediate partition wall 48 into upper and lower spaces. The lower space below the wall 48 serves as the air passage 42 and the upper space above the wall 48 serves as a receiving portion for a main part of the first electric component 51. Thus, air from the blower fan 50 flows along the air passage 42 as indicated by an arrow via the air inlet 41 and an air introduction duct 55 while cooling fins 51F of the first electric component 51, and turns toward the front side, that is, the viewer's side of the drawing at an end of the air passage 42.

As shown in FIG. 4B (the sectional view taken along the line IV'—IV' of FIG. 3), air flowing from the back side toward the front side of the drawing advances along the air passage 42, cools fins 52F of the second electric component 52 and flows downward through the air outlets 43, 43 (with the outlet 43 on the back side being not shown) at the termination end of the passage.

Thus, when the wind box 40 is viewed from the side thereof, the air inlet 41 and air outlets 43 are located at substantially the same positions, and therefore it can be considered that air flows forward and returns.

FIG. 5 is a sectional view taken along the line V—V of FIG. 3, showing that the fins 51F . . . , 52F . . . of the first and second electric components 51, 52 are arranged to suspend down into the air passage 42 so that the fins can forcibly be cooled in an efficient fashion. Not only does the intermediate partition plate 48 constitute a ceiling for the air passage 42 but also it serves as a partition plate for partitioning the central space 46.

In FIG. 5, reference numeral 56 denotes a packing, 58; a floor plate, and 59; a wide opening formed in the floor plate 58.

Figure 6:
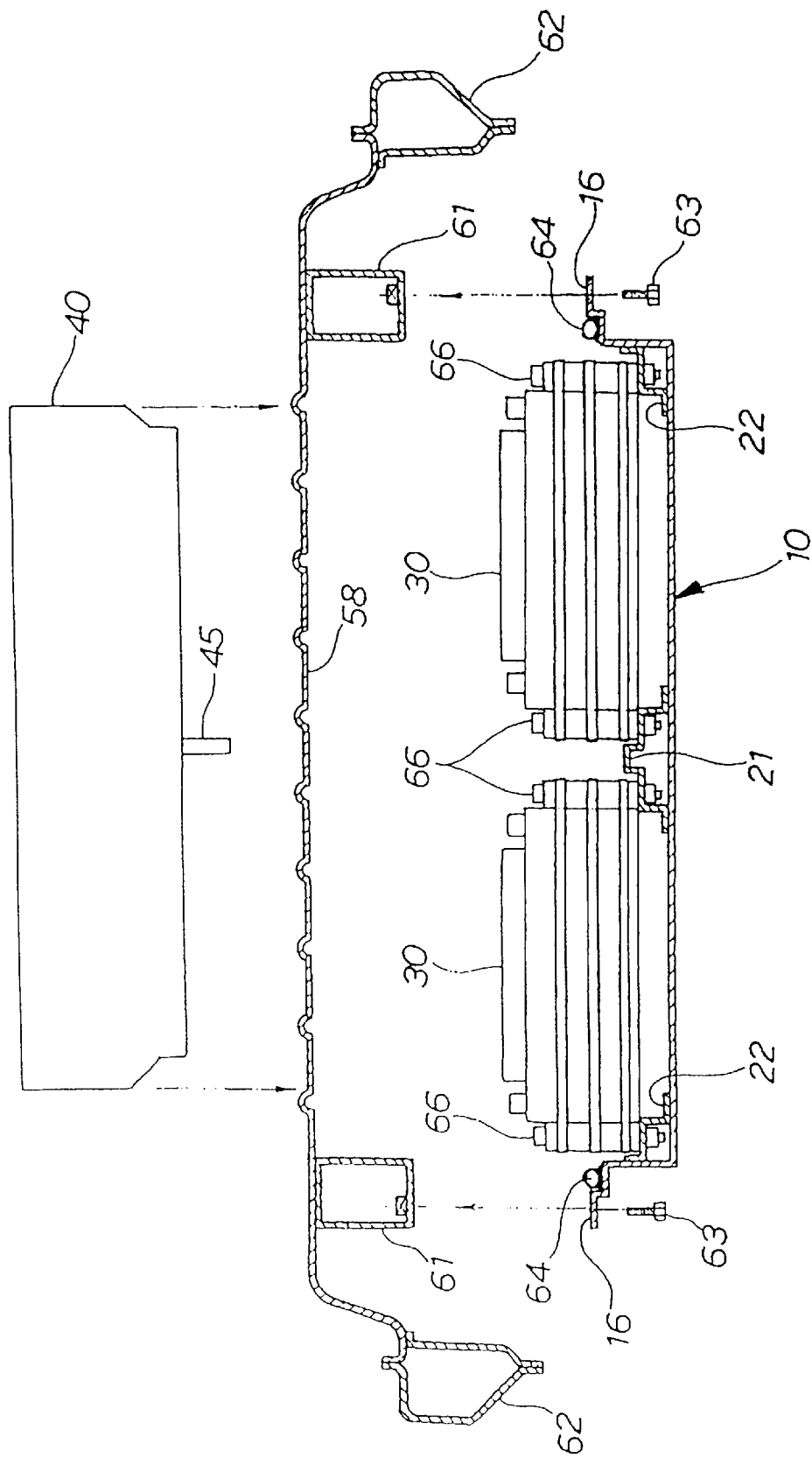
FIG. 6 is an explanation view showing a mounting procedure of the cooling structure of the present invention onto the vehicle body.

FIG. 6 is a view showing how the cooling structure according to the present invention is assembled to the vehicle body. A pair of left and right side frames 61, 61 and a pair of left and right side sills 62, 62 are mounted on a lower surface of the floor plate 58 of the vehicle body. The wind box 40 and the battery box 10 in which the batteries 30 . . . have already been mounted are placed from above and mounted from below on the floor plate 58. To be specific, the seal flanges 16, 16 are applied to lower surfaces of the side frames 61, 61 and are then fixed thereto by screwing bolts 63 . . . thereinto. Reference numeral 64 denotes a packing.

The batteries 30 . . . are placed on the center rail 21 and left and right rails 22 and are then fixed to the rails 21, 22 with long bolts 66 . . . Thus, the batteries 30 . . . are mounted on the side of the battery box 10 in advance.

Figure 7:
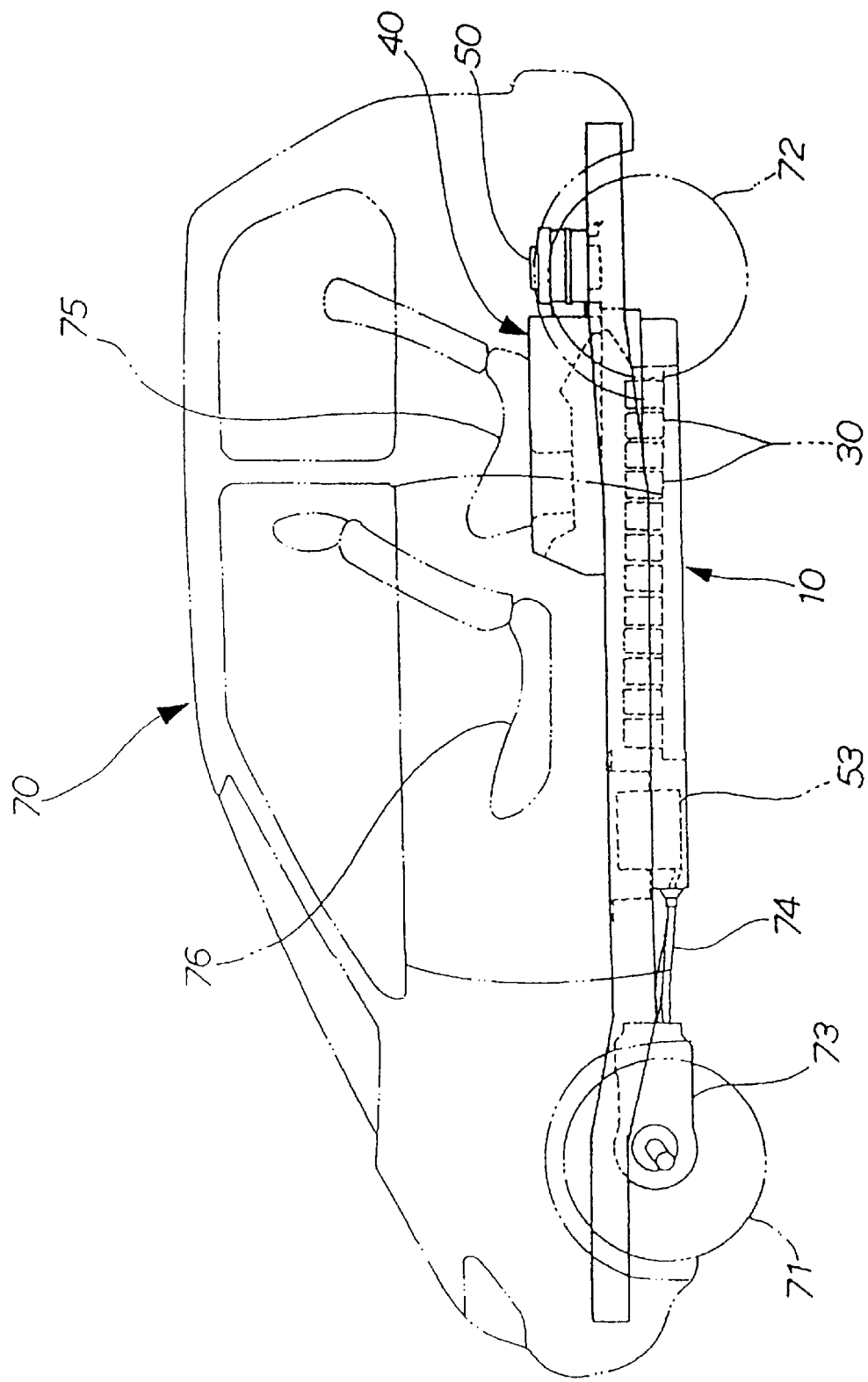
FIG. 7 is a side view of a vehicle equipped with the cooling structure according to the present invention.

FIG. 7 is a side view of a vehicle equipped with the cooling structure according to the present invention. An electric vehicle 70 is provided with front and rear wheels 71, 72 at the front and rear thereof, and a driving electric motor 73 is mounted on the side of the front wheels 71. The battery box 10 and the wind box 40 are mounted on the vehicle between the front and rear wheels 71, 72, whereby electricity is supplied from the battery box 10 to the electric motor 73 with wiring harnesses 74.

In general vehicles, a rear seat 75 is raised higher than front seats 76 in order to secure the frontal visibility of rear passengers. As a result of this, there is provided an extra space in height below the rear seat 75, and therefore the wind box 40 is placed in the space so provided to thereby attain a well-balanced layout of the components as a whole.

Figure 8:
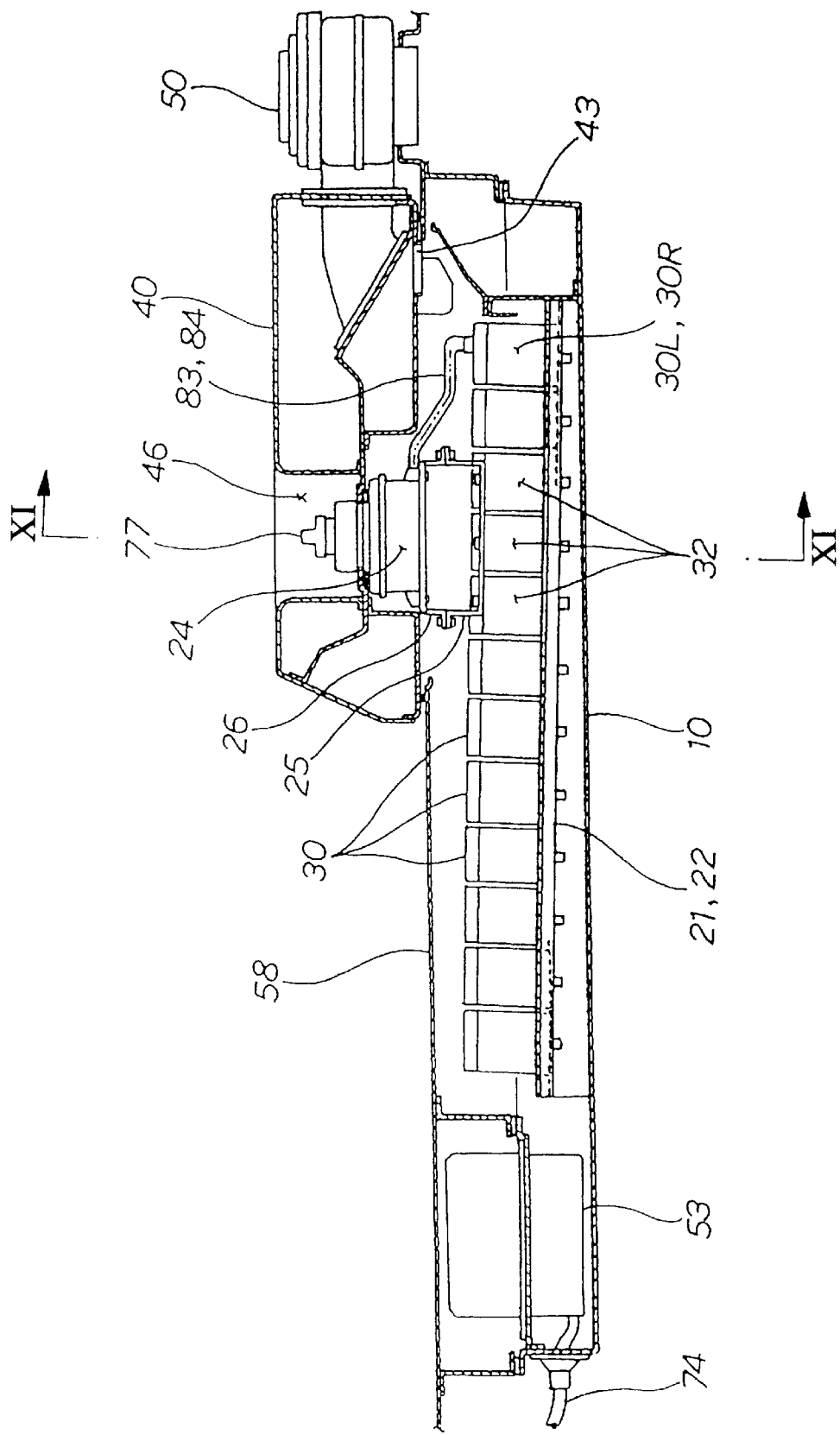
FIG. 8 is a longitudinal sectional view of the cooling structure for an electric vehicle according to the present invention.

FIG. 8 is a longitudinal sectional view of the cooling structure for an electric vehicle according to the present invention. The battery box 10 is mounted on the lower surface of the floor plate 58, and the breaker box 24 is attached to the battery box 10 via the breaker box supporting brackets 25, 26 (this process including a case where the breaker box 24 is attached to the battery box in advance). Then, the wind box 40 is attached to the upper surface of the floor plate 58 in such a manner as to cover breaker box 24 from above. This completes the accommodation of the breaker box 24 and a main switch 77 in the central space 46 of the wind box 40.

As is clear from the drawing, the space 46 can effectively be utilized, and since it surrounds the main switch 77 which requires handling with care, the wind box 44 now serves as a guard member for surrounding the main switch 77 and the breaker box 24.

In addition, FIG. 8 shows that the air outlets 43 of the wind box 40 are faced toward one end of the battery box 10.

Moreover, since the rails 21, 22 for supporting the batteries 30 are inclined upwardly toward the front of the vehicle body, the batteries 30 . . . located at the front tend to be raised to a higher level than those at the rear.

Air entering the battery box 10 from the air outlets 43 absorbs heat when cooling the batteries 30 . . . with its density being reduced, and this causes the air to float. In other words, air tends to float while advancing forward, but since the batteries 30 . . . are also raised higher as they go forward, the batteries 30 . . . can thoroughly be cooled with air so moving.

Furthermore, the breaker box 24 is interposed between an array of twelve batteries 30 . . . on the front side and the other array of twelve batteries 30 . . . on the back side of the drawing, and this makes it possible to reduce the total voltage applied when the breaker works (the circuit is broken) to one-half the total voltage for the whole batteries (24 batteries) by operating the main switch 77.

Figure 9:
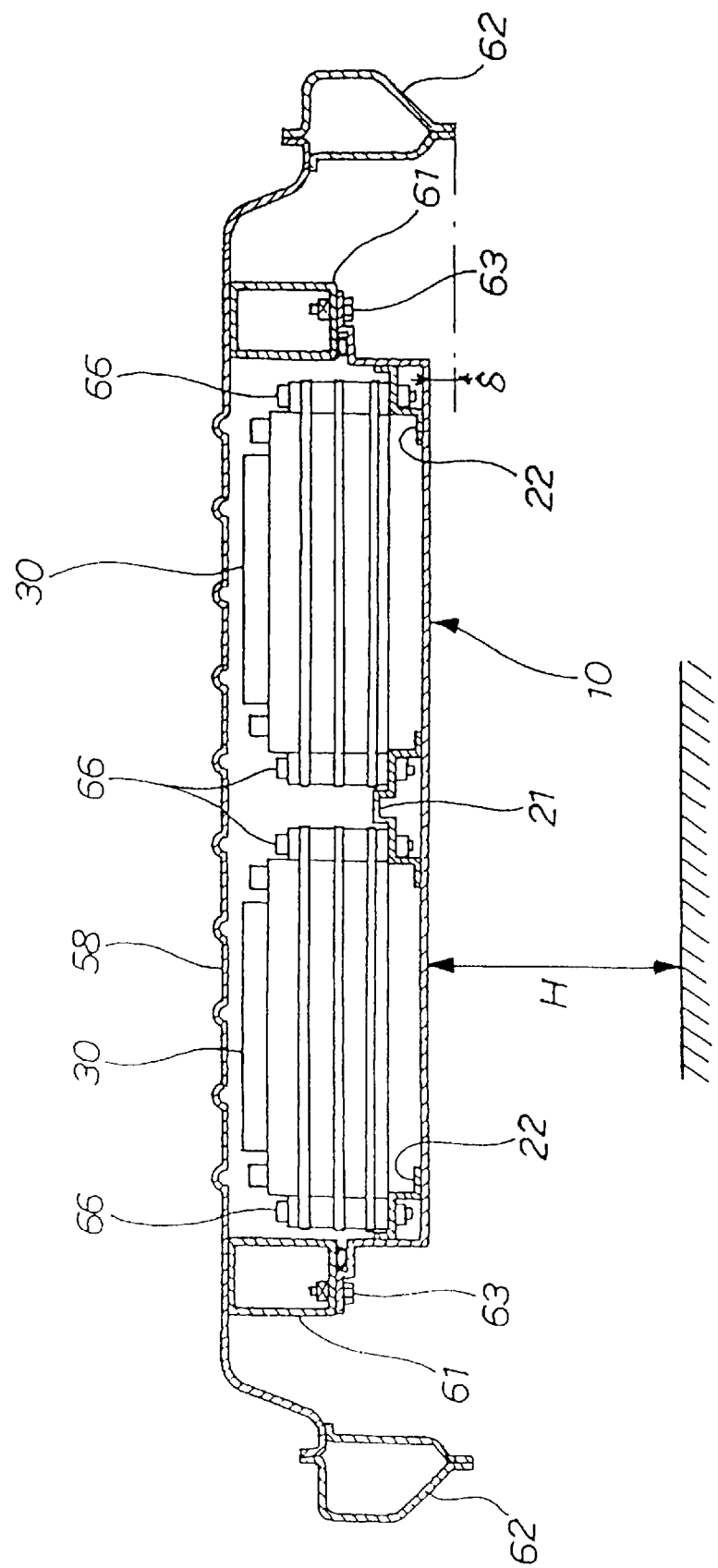
FIG. 9 is a longitudinal sectional view of the cooling structure for an electric vehicle according to the present invention.

FIG. 9 is a longitudinal sectional view of the cooling structure for an electric vehicle according to the present invention, and the figure shows that the height of the battery box 10 is on the order of one-half that of the battery 30, and that an upper half section of the battery box 10 is constituted by the left and right side frames 61, 61 and the floor plate 58.

When compared with a case where the battery box 10 is constituted by a complete box unit, which is attached to the floor plate 58, this can obviate the necessity of the upper half section of the box unit, and the dimension from the ground surface to the lower surface of the battery box (ground clearance H) can be increased.

However, in this construction in which a lower half section of the box unit is constituted by the battery box 10, while the upper half section thereof is constituted by the side frames 61, 61 and the floor plate 58, there is produced a problem with respect to the connecting and sealing properties between the battery box 10 and the side frames 61, 61. There is produced no such concern when the battery box is a complete box unit.

In this embodiment, the flanges that are brought into contact with the frames 61, 61 are constituted by a combination of the seal flange 16 and mounting flanges 17 . . . In other words, a heavy weight occupied mainly by that of the batteries 30 . . . is dealt with by bolting the battery box 10 to the side frames 61, 61 via the reinforcement frames 27 . . . and the mounting flanges 17 . . . , whereby the rigidity can be secured. This can be fulfilled only by making sturdy the reinforcement frames 27 . . . and the mounting flanges 17 . . . , and the peripheral walls 12 to 15 do not have to be made sturdy, thereby making it possible to make the battery box 10 thinner in thickness and lighter in weight.

The portions of the combined flanges other than the mounting flanges 17 . . . are made to function as the seal flange 16. This seal flange 16 is exclusively used for sealing, and therefore it does not have to be as rigid as the mounting flange. Thus, the seal flange 16 can be made thin and this assists in reducing the weight of the battery box 10.

Thus, constituting the flanges at the connecting portion by a combination of the seal flange 16 and the mounting flange 17 . . . makes it possible not only to make the sealing properties complete but also to reduce the weight of the battery box 10.

Furthermore, it is also a structural feature of the present invention that the lower surface of the battery box 10 is raised higher by δ than the lower ends of the side sills 62, 62. This allows the side sills 62, 62 to guard the battery box 10 from foreign matters (pebbles, earth and sand, muddy water or the like) flying from the left or right side. In addition, the side sills 62, 62 can function as a screen member for preventing the battery box 10 from being seen from the sides, this improving the appearance of the lower portion of the vehicle body.

The electric components 51, 52 can be any kind of electric equipment if it needs air cooling, and since the overall length of the air passage 42 in the embodiment is sufficiently long, one or more, or a plurality of components maybe arranged therein without causing any problem.

Figure 10:
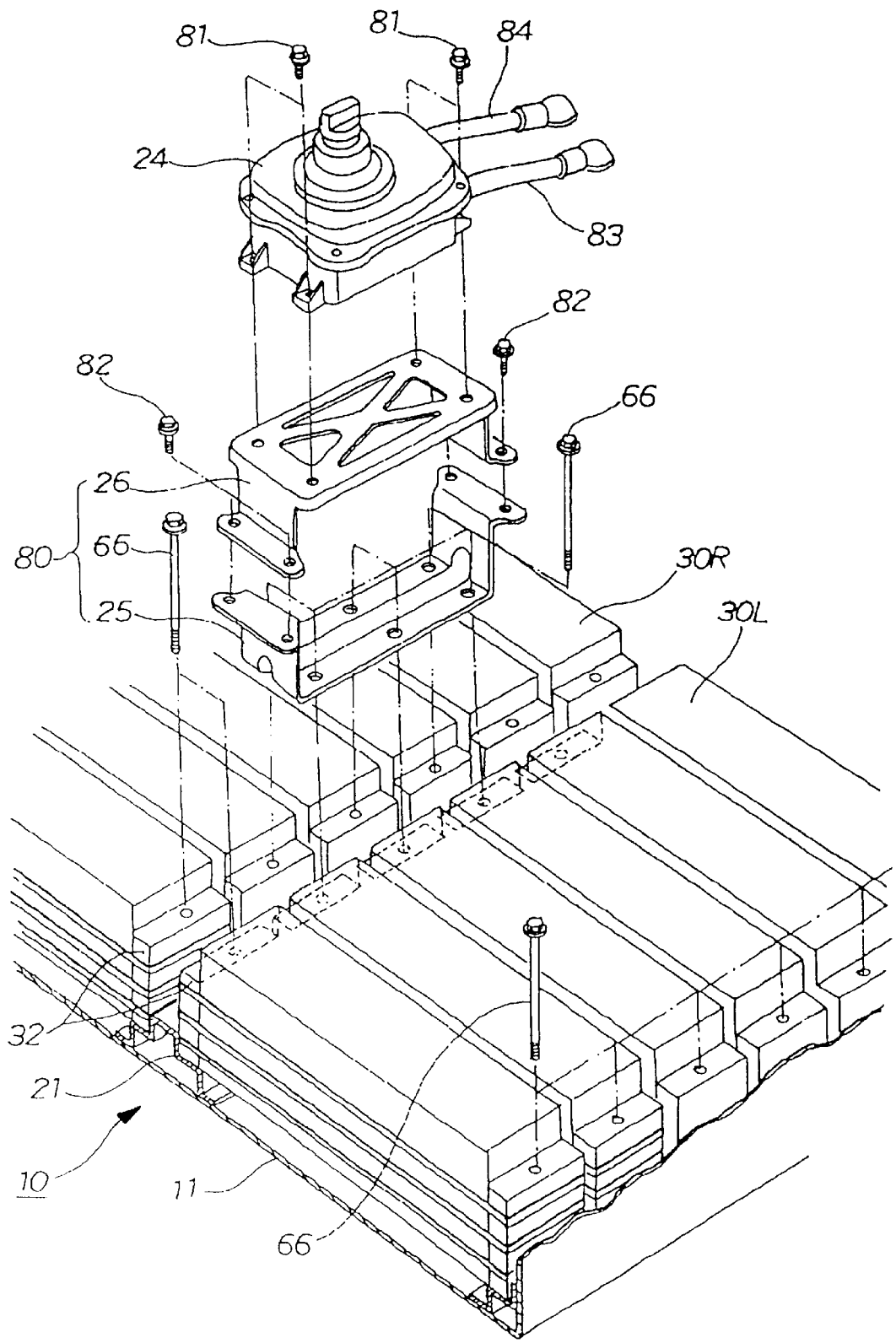
FIG. 10 is an exploded perspective view of a breaker box mounting structure according to the present invention.

FIG. 10 is an exploded perspective view showing a breaker box mounting structure according to the present invention in which the breaker box 24 is mounted on the bottom plate 11 of the battery box 10 via the stay 80.

To be specific, the stay 80 includes the fixing plates 32 . . . (six plates) each constituting a part of each battery 30 and breaker box supporting brackets 25, 26. The breaker box supporting brackets 25, 26 are fixed to a center rail 21, that is, the bottom plate 11 side with long bolts 66 . . . in conjunction with the fixing plates 32 . . . These long bolts 66 are components prepared in advance for fixing the fixing plates 32 . . . to the center rail 21.

In view of the convenience in mounting them, the breaker box supporting brackets 25, 26 are constructed so as to be split in vertical directions.

Namely, the lower breaker box supporting bracket 25 is placed on the upper surfaces of the fixing plates 32 . . . and are then clamped together with them to the center rail 21 with six long bolts 66 . . .

In addition, the breaker box 24 is placed on the upper breaker box supporting bracket 26 and is then screwed thereto with machine screws 81 . . . Then, the upper and lower breaker box supporting brackets 25, 26 are aligned with each other for connection with machine screws 82.

Thereafter, accessory wiring harnesses 83, 84 may be attached to connect the breaker box 24 with a battery 30L at the end of a left-hand side array of batteries and a battery 30R at the end of a right-hand side array of batteries. This order of assembly is shown as an example, and therefore the assembling order may be changed.

In FIG. 8, connecting the wiring harnesses 83, 84, respectively, to the batteries 30L, 30R (30R is backward of 30L) means that the breaker box 24 is intervened between the left-hand side array of twelve batteries 30 . . . and the right-hand side array of twelve batteries 30 . . . , whereby the total voltage applied when the breaker works (the circuit is broken) can be reduced to one-half the total voltage of the whole batteries (twenty-four batteries in total).

Figure 11:
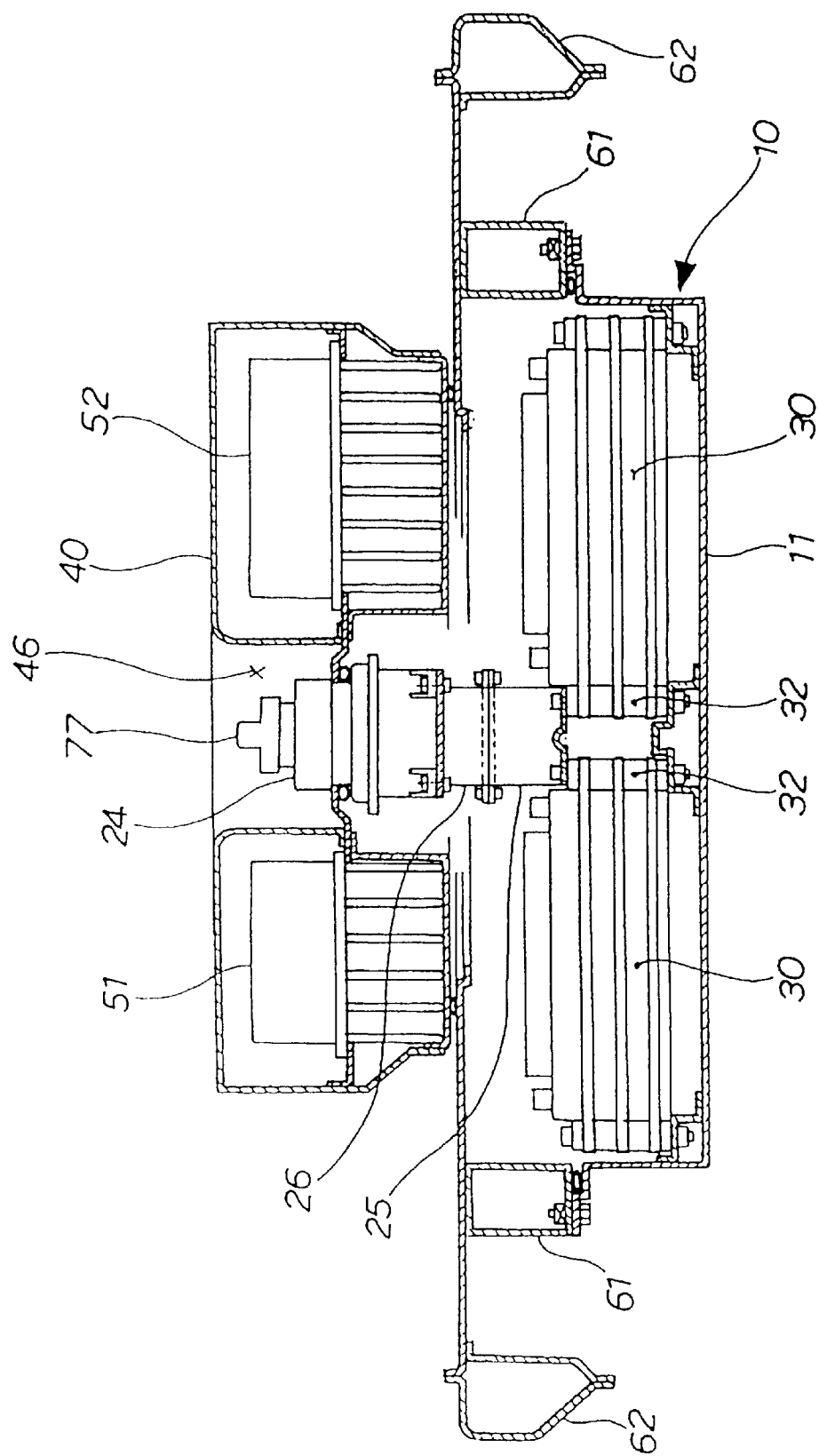
FIG. 11 is a sectional view taken along the line XI—XI of FIG. 8.

FIG. 11 is a sectional view taken along the line XI—XI of FIG. 8, showing that the breaker box supporting brackets 25, 26 are placed on the fixing plates 32, 32, that the breaker box 24 is placed on those brackets, and that the breaker box so placed is located just in the center space 46 of the wind box 40.

Furthermore, the breaker box 24 can be disposed at an intermediate position between the left- and right-hand side arrays of batteries 30 . . . , and in FIG. 10, since the distances from the breaker box 24 to the left-hand side battery 30L and to the right-hand side battery 30R become the same, the lengths of the wiring harnesses 83, 84 can be reduced satisfactorily.

Figure 12A:
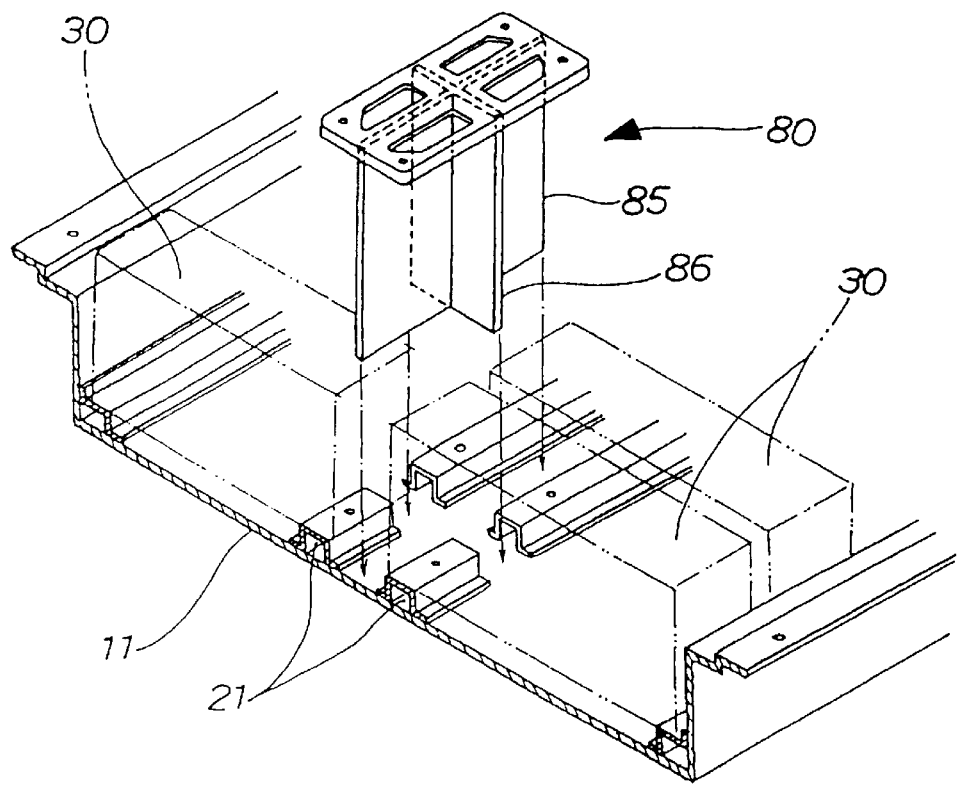
FIGS. 12A and 12B are views showing another embodiment of a breaker box mounting structure according to the present invention.
Figure 12B:
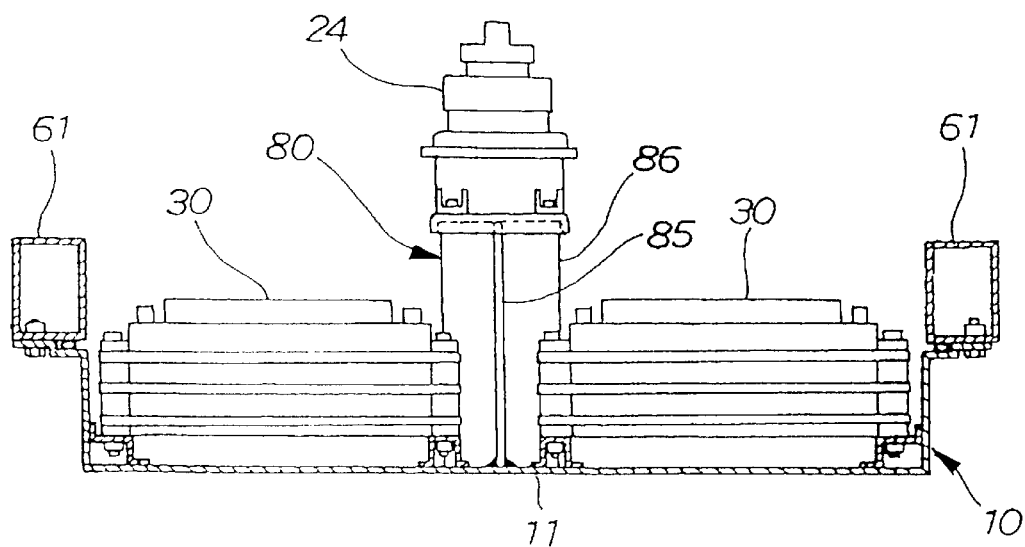
Figure 13A:
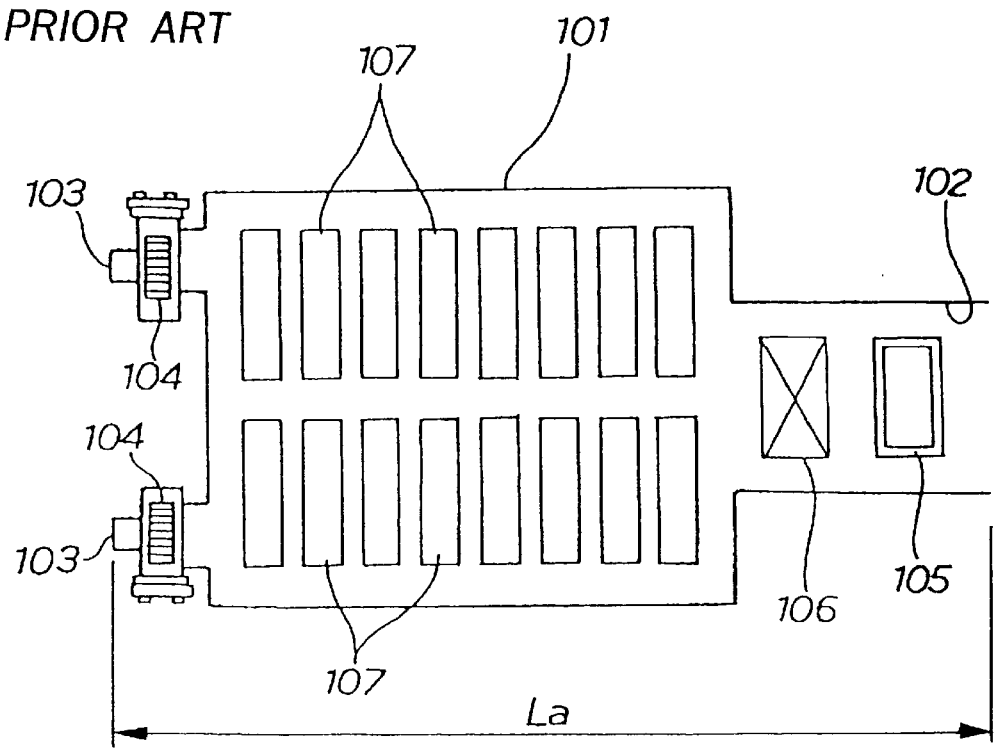
FIGS. 13A and 13B show typical examples of conventional cooling structures for an electric vehicle.
Figure 13B:
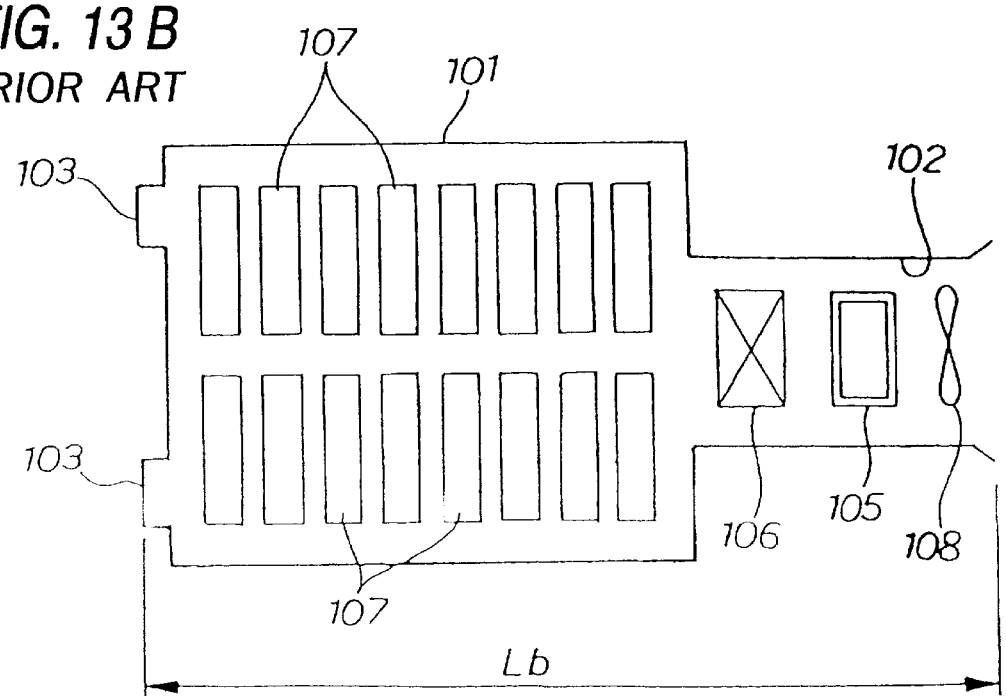

FIGS. 12A and 12B show another embodiment of a breaker box mounting structure according to the present invention.

As shown in FIG. 12A, the stay 80 includes leg plates 85, 86 crossing with each other and the stay 80 is fixed to the bottom plate 11 by inserting the respective leg plates into gaps between the batteries 30 . . . and center rails 21.

As shown in FIG. 12B, the breaker box 24 can be held between the left and right batteries 30 . . . and at a predetermined height.

Consequently, any configuration and structure may be adopted for the stay 80.

With the construction described above, the following effectiveness is provided by the present invention.

(1) Since the wind box for forcibly cooling at least one electric component is overlaid on the battery box, the overall length of the cooling structure of an electric vehicle can be reduced when compared with a structure in which the wind box is connected in series to the battery box.

Furthermore, the overall length of the wind box can be reduced by forming therein the substantially U-shaped air passage as viewed from the top, and the air inlet and the air outlets of the wind box are set at substantially the same position, whereby cooling of the battery box can be initiated in the vicinity of the blower fan. Therefore, although the overall length of the wind box is short, the electric components and batteries can effectively be cooled.

(2) The breaker box is disposed in the space at the center of the substantially U-shaped air passage. Thus, the space at the center of the wind box can effectively utilized by disposing the breaker box therein.

(3) The stay is assembled to the bottom plate of the battery box that is attached under the floor plate of the electric vehicle, so that the breaker box can be mounted on the stay. In this construction, the batteries are placed on the bottom plate side and the breaker box is also mounted on the bottom plate side, and therefore everything including the wiring harnesses can be placed in the common battery box. This facilitates operations involved in mounting and dismounting the breaker box, laying out the wiring harnesses and mounting the breaker box.

(4) The stay includes the fixing plates constituting a part of batteries and the breaker box supporting brackets supporting the breaker box. The breaker box supporting brackets are fixed to the bottom plate together with the fixing plates with long bolts. The fixing plates on the battery side are also used as part of the stay supporting the breaker box, and the long bolts are also used as fixing bolts, thereby making it possible to reduce the number of components used, as well as to make the stay lighter in weight and smaller in size.

The present disclosure relates to the subject matter contained in Japanese patent application No. Hei. 10-205672 filed on Jul. 21, 1998 which is expressly incorporated herein by reference in its entirety.

While only certain embodiments of the invention have been specifically described herein, it will apparent that numerous modifications may be made thereto without departing from the spirit and scope of the invention.

What is claimed is:

1. A cooling structure for an electric vehicle, comprising:
   a battery box provided with at least one battery;
   a blower fan supplying air to cool said at least one battery;
   a wind box disposed on said battery box and provided with at least one electric component to be cooled, said wind box being formed with an air passage having a substantially U-shape when viewed from the top in such a manner that said electric component is disposed thereon, said wind box including an air inlet connected to said blower fan and an air outlet communicating with one end of said battery box, so that the air from said blower fan is supplied to said battery box via said wind box.

2. A cooling structure for an electric vehicle according to claim 1, further comprising:
   a breaker box disposed in a space at the center of said air passage forming the substantially U-shape.

3. A cooling structure for an electric vehicle according to claim 1, further comprising:
   a breaker box attached to said battery box via a stay, said stay being assembled to a bottom plate of said battery box to be attached under a floor plate of the electric vehicle, and said breaker box is attached to said stay.

4. A cooling structure for an electric vehicle according to claim 3, wherein said stay comprises:
   fixing plates constituting a part of said at least one battery;
   a breaker box supporting bracket supporting said breaker box; and
   a long bolt fixing said breaker box supporting bracket together with said fixing plates to said bottom plate.

5. A cooling structure for an electric vehicle according to claim 3, wherein said stay comprises:
   leg plates fixed to said breaker box and crossing substantially at right angles with each other; and
   a breaker box supporting plate attached to said leg plates and supporting said breaker box.

6. A cooling structure for an electric vehicle according to claim 5, wherein said leg plates are formed as a single, unitary member.

7. A cooling structure for an electric vehicle according to claim 1, wherein said battery box comprises:
   a bottom plate;
   a peripheral wall extending upwardly from said bottom plate, said peripheral wall having a seal flange for sealing within said battery box and a mounting flange for mounting said battery box on a floor plate of the electric vehicle; and
   a reinforcement frame surrounding around said bottom plate and peripheral wall.

8. A cooling structure for an electric vehicle according to claim 1, wherein said battery box is provided with a plurality of said batteries, and said battery box comprises:
   a bottom plate; and
   a rail fixed to said bottom plate for mounting said plurality of batteries in a row along the longitudinal direction of the electric vehicle,
   wherein one said battery located at a front side of the electric vehicle is arranged to be higher than another said battery located at a rear side thereof via said rail.

9. A cooling structure for an electric vehicle according to claim 1, wherein said battery box is attached under a floor plate of the electric vehicle so that said wind box is arranged below a rear seat of the electric vehicle.

10. A cooling structure for an electric vehicle according to claim 1, wherein said air outlet is formed in a lower surface of said wind box.

11. A cooling structure for an electric vehicle according to claim 1, wherein said wind box includes an intermediate wall partitioning a space within the wind box into an upper space and a lower space, said air passage being defined in said lower space.

12. A cooling structure for an electric vehicle according to claim 1, wherein said wind box is disposed on an upper surface of said battery box.

13. A cooling structure for an electric vehicle according to claim 12, wherein said air outlet is formed in a lower surface of said wind box.

* * * * *

UNITED STATES PATENT AND TRADEMARK OFFICE
CERTIFICATE OF CORRECTION

PATENT NO. : 6,188,574 B1
DATED : February 13, 2001
INVENTOR(S) : M. Anazawa

Page 1 of 1

It is certified that error appears in the above-identified patent and that said Letters Patent is hereby corrected as shown below:

<u>Title page,</u>
Item [56], "References Cited", further under "U.S. PATENT DOCUMENTS",
for Patent No. 5,534,364 correct the spelling of "Watanaabe et al." to -- Watanabe et al. --; and for Patent No. 6,085,854 correct the spelling of "Nishkawa" to -- Nishikawa --.

<u>Column 4,</u>
Line 57, after "cover" insert -- the --;
Line 62, after "77" insert a comma.

<u>Column 6,</u>
Line 4, change "this" to -- thus --;
Line 9, change "maybe" to -- may be --.

<u>Column 7,</u>
Line 25, after "can" insert -- be --;
Line 51, after "will" insert -- be --.

Signed and Sealed this

Twenty-seventh Day of November, 2001

*Attest:*

*Attesting Officer*

NICHOLAS P. GODICI
*Acting Director of the United States Patent and Trademark Office*